United States Patent
Nielsen et al.

(10) Patent No.: US 11,846,266 B2
(45) Date of Patent: Dec. 19, 2023

(54) FASTENER ASSEMBLY, WIND TURBINE HUB ASSEMBLY AND RELATED METHODS

(71) Applicants: LM WIND POWER A/S, Kolding (DK); LM WIND POWER (SPAIN) S.A., Ponferrada (ES)

(72) Inventors: Michael Wenani Nielsen, Lunderskov (DK); Diego Vidal Rebollal, Ponferrada (ES)

(73) Assignees: LM WIND POWER A/S, Kolding (DK); LM WIND POWER (SPAIN) S.A., Ponferrada (ES)

( * ) Notice: Subject to any disclaimer, the term of this patent is extended or adjusted under 35 U.S.C. 154(b) by 0 days.

(21) Appl. No.: 18/116,180

(22) Filed: Mar. 1, 2023

(65) Prior Publication Data

US 2023/0296075 A1 Sep. 21, 2023

(30) Foreign Application Priority Data

Mar. 2, 2022 (EP) .................................... 22382194

(51) Int. Cl.
| | | |
|---|---|---|
| F03D 1/06 | (2006.01) | |
| F03D 80/00 | (2016.01) | |
| F16B 33/00 | (2006.01) | |

(52) U.S. Cl.
CPC ........... *F03D 1/0658* (2013.01); *F03D 80/00* (2016.05); *F16B 33/008* (2013.01); *F05B 2240/57* (2013.01); *F05B 2260/30* (2013.01); *F05B 2260/301* (2013.01); *F05B 2260/64* (2013.01)

(58) Field of Classification Search
CPC ................ F03D 1/0658; F05B 2240/57; F05B 2260/301; F05B 2260/64; F16B 33/008
See application file for complete search history.

(56) References Cited

U.S. PATENT DOCUMENTS

| | | | | |
|---|---|---|---|---|
| 8,297,900 | B2* | 10/2012 | Sumiya | F02F 7/006 403/408.1 |
| 8,727,731 | B2* | 5/2014 | Bendel | F03D 1/0675 416/239 |
| 2014/0023511 | A1* | 1/2014 | Lund | C23F 13/10 416/224 |
| 2019/0271350 | A1* | 9/2019 | Elmose | F16B 33/008 |

FOREIGN PATENT DOCUMENTS

| | | | | |
|---|---|---|---|---|
| DE | 102008045939 A1 | * | 3/2010 | ........... F03D 1/0658 |
| EP | 3657012 A1 | * | 5/2020 | ........... F03D 1/0658 |
| KR | 20130061809 A | * | 6/2013 | ........... F03D 1/0658 |

* cited by examiner

*Primary Examiner* — Justin D Seabe
(74) *Attorney, Agent, or Firm* — Nath, Goldberg & Meyer; Jerald L. Meyer; Tanya E. Harkins

(57) ABSTRACT

The present disclosure relates to fastener assemblies (400) for a wind turbine blade (22) to rotor hub (20) connection, wherein the fastener assembly (400) comprises a fastener (401) and one or more sleeves (410) configured to absorb the ingress of liquid into a blade root insert (220). The present disclosure also relates to wind turbine hub assemblies (1000) and associated methods (700).

15 Claims, 5 Drawing Sheets

FASTENER ASSEMBLY, WIND TURBINE HUB ASSEMBLY AND RELATED METHODS

FIELD

The present disclosure relates to methods and systems for joining wind turbine blades to a wind turbine hub, and more particularly relates to assemblies configured to limit and absorb the ingress of liquid into a blade root insert of a wind turbine blade, and methods for providing the same.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

In order to extract more energy from the wind, the size of the rotor diameter is increased by increasing the dimensions of the wind turbine blades. The larger size of the blades introduces higher physical loads to the blade and related components. For example, larger rotor blades may experience increased stresses at the connection between the blade root and the rotor hub, leading to challenging design constraints, both characterized by extreme events and fatigue life requirements.

The likelihood of structural failure at the rotor blade joint is typically increased by the ingress of liquid into the blade root insert. Ingress of liquid may occur e.g. due to assembly tolerances of the different components. Loss of preload due to liquid ingress can also occur in the bolted joint, which is known to reduce fatigue life. Further, the ingress of liquid such as water and oil into the blade root insert may also lead to the blade root insert to separate from the blade root, causing severe damage and leading to loss of revenue.

Thus, to endure the load envelope specific to the rotor blade root, various approaches have been devised and implemented in the past to improve the sealing of the blade root insert. Some approaches include sealing the blade root insert externally using sealant products such as foams, or other sealings with polymeric base. Other approaches include the placement of rubber gaskets, i.e. O-rings, around the fasteners to mitigate the ingress of liquid into the inserts.

However, the problem has not been resolved with these prior art solutions and the possibility that a volume of liquid, either external to the wind turbine such atmospheric precipitation or internal to the wind turbine such as oil derivatives from hydraulic systems, bypasses the sealant and reaches the blade root insert, and more precisely the threaded portion of the blade root insert remains. For example, sealants may be applied in a liquid or slurry form and when they solidify change their volume, thus not effectively filling up a space between blade root insert and fastener.

As a result, there is a need for assemblies having improved sealing properties that are directed to blade root connections.

The present disclosure provides examples of assemblies and methods that at least partially overcome some of the drawbacks of existing fastener assemblies for a wind turbine blade to rotor hub connection.

SUMMARY

In a first aspect, a fastener assembly for a wind turbine blade to rotor hub connection is disclosed. The fastener assembly comprises a fastener which is configured to be fastened to a blade root insert. The fastener includes a threaded portion for threadedly coupling to the blade root insert. Further, the fastener includes one or more sleeves configured to absorb ingress of liquid into the blade root insert. The sleeves are arranged at a non-threaded portion of the fastener, said portion configured to be inserted into the blade root insert.

According to this first aspect, the fastener assembly mitigates the ingress of liquid into the blade root insert in a simple and yet reliable manner. This can result in a considerable reduction in maintenance and replacement costs. Further, the simplicity of the assembly allows to replace and upgrade fasteners of existing assemblies without the need of a complete replacement. This can be done, for example, during maintenance tasks such as preload verification of the blade connection. Besides, the disclosed assembly can be easily installed and has a very reduced material cost.

In another aspect, a method for coupling a wind turbine blade to a rotor hub with a fastener assembly is disclosed. The fastener assembly used in the method includes a fastener, and one or more sleeves. The sleeves are configured to absorb the ingress of liquid into a blade root insert and are arranged at a non-threaded portion of the fastener. The method comprises fastening the fastener to the blade root insert so that the sleeves are inserted into the blade root insert. Further, the method comprises coupling the wind turbine blade to the rotor hub through the fastener.

Throughout this disclosure, the term "sleeve" should be understood as a material or component that is suitable for at least partially surround a fastener. In examples, a sleeve may have a substantially tubular shape. A sleeve may be coupled to the fastener or to the inner periphery of the blade root insert.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
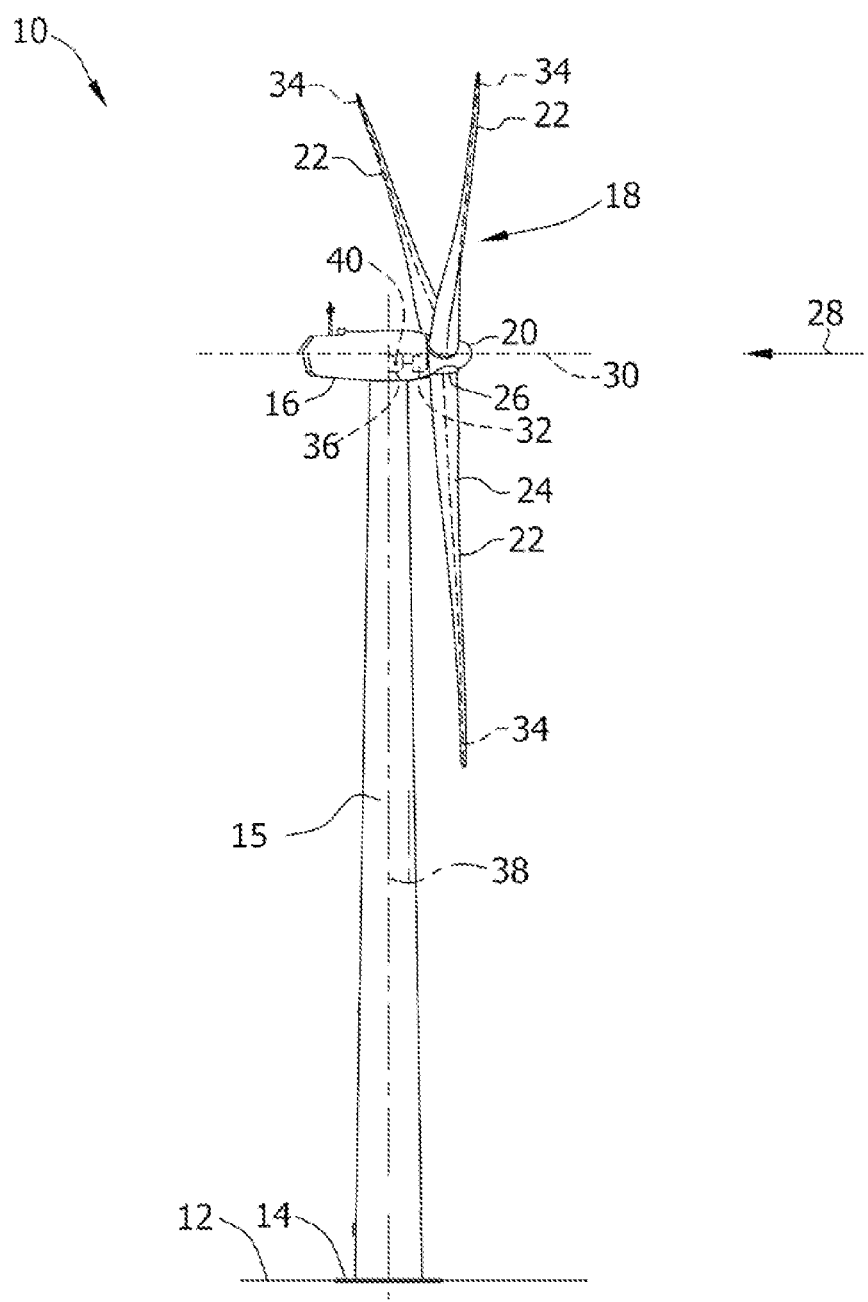
FIG. 1 illustrates a perspective view of a wind turbine according to one example.

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
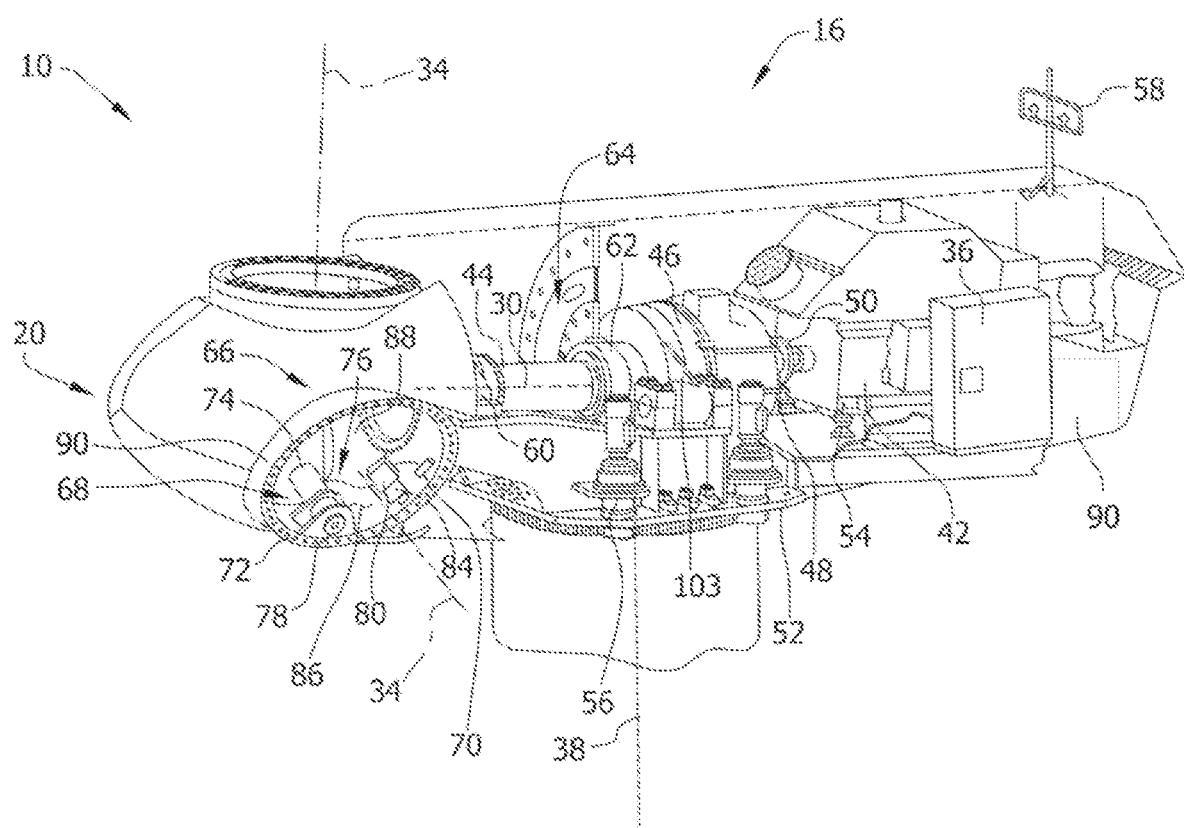
FIG. 2 illustrates a detailed, internal view of a nacelle of a wind turbine according to one example.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage of e.g. 400V to 1000 V into electrical energy having medium voltage (e.g. 10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
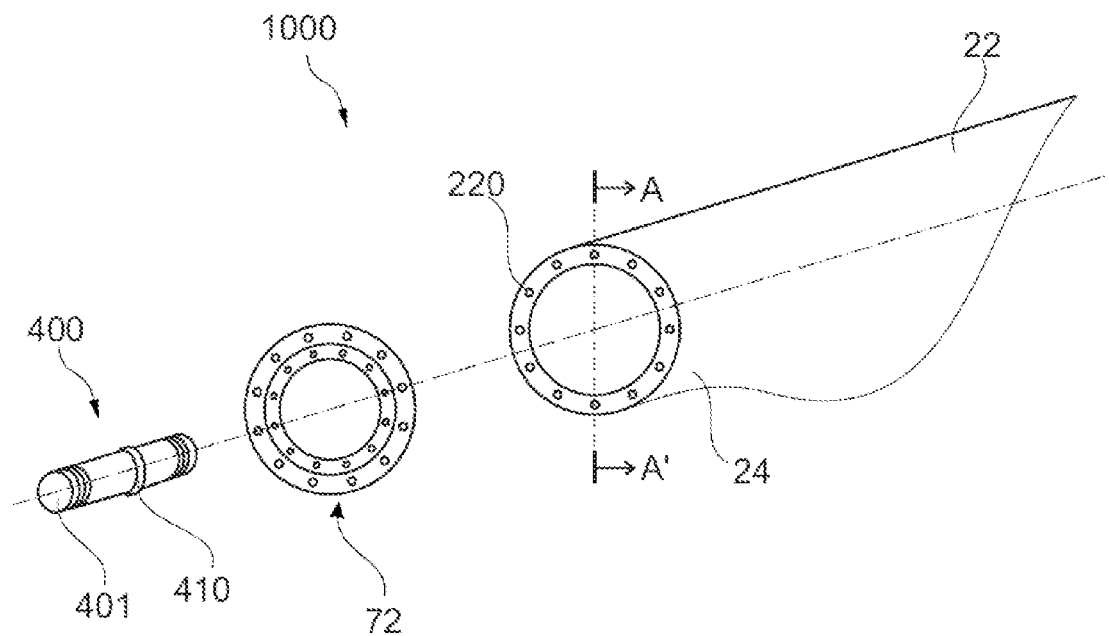
FIG. 3 schematically illustrates a wind turbine hub assembly according to one example.

FIG. 3 schematically illustrates a wind turbine hub assembly 1000 according to one example. In FIG. 3, several components of the assembly 1000 such as the rotor hub 22 have not been illustrated in order to simplify. The wind turbine hub assembly 1000 comprises a wind turbine hub 20 and a wind turbine blade 22 having a plurality of blade inserts 220 in a blade root portion 24.

As explained hereinbefore, during operation of the wind turbine, a pitch system may particularly change a pitch angle of the rotor blades such that the angle of attack of (portions of) the rotor blades are reduced or increased. A pitch system may be a hydraulic pitch system or an electromechanical pitch system for rotating blades around their longitudinal axes.

The wind turbine hub assembly 1000 comprises a pitch bearing 72 comprising a first ring connected to the wind turbine hub 20 and a second ring connected to the wind turbine blade 22 with a plurality of fasteners 401. The fasteners may be bolts or studs.

Additionally, the fasteners 401 in this example are threadedly coupled to the blade inserts 220 and comprise a sleeve 410 for absorbing liquid.

This wind turbine hub assembly 1000 significantly reduces the ingress of liquid into the blade root insert 220 further downstream from the sleeve 410. Thus, when a volume of liquid reaches the sleeve 410, the sleeve 410 absorbs and retains the liquid. By doing so, the sleeve 410 also swells up, and thereby reducing subsequent liquid bypass and protecting the coupling between the blade root insert 220 and the fastener 401. Further, this is achieved using a simple and reliable approach with a very reduced material cost, and which is easy to implement in existing wind turbines. The wind turbine hub assembly 1000 extends the working life of the connection components and reduces the maintenance costs. Even if additional sealants are used, some liquid might bypass the sealant, and this liquid can be absorbed by sleeve 410.

In examples, the blade root inserts 220 may be made of metal, high-strength plastic or polymer composite materials. The blade root inserts may have a nearly uniform cylindrical shape or a cylindrical shape with a conical opening to facilitate the introduction of the fasteners 401. Further, the blade root inserts 220 may be arranged in the blade root 24 by incorporating them in a resin infusion process when manufacturing the blade and by gluing.

In examples, the sleeves 410 may be configured to contact an inner wall of the blade root insert 220 in a saturated or in a partially saturated state. Thus, when the sleeve 410 absorbs a certain amount of liquid, it swells and expands, blocking the ingress of liquid into the blade root insert 220. Thus, the sleeves 410 prevent any liquid to reach the threaded coupling between the fasteners 401 and the blade root inserts 220.

In some further examples, the sleeves 410 are arranged in a portion of the fastener 401 that substantially coincides with an opening of the blade root insert 220 at the root edge of the blade when the fastener 401 is inserted into the blade root insert 220. This configuration very effectively limits the accumulation of liquid and debris in the blade root insert 220, even upstream of the sleeve 410.

In other examples, the wind turbine hub assembly 1000 may further comprise one or more gaskets 420 (illustrated in FIGS. 4 to 6) arranged at a non-threaded portion of the fastener 401. Said non-threaded portion of the fastener 401 is configured to be inserted into a blade root insert 220. The gaskets 420 can be made of rubber or any other suitable material that provides sealing. The gaskets 420 represent an additional barrier that hinders the penetration of liquid into the blade root insert 220, and therefore protects the threaded portion of the same. Moreover, the gaskets can aid in maintaining the sleeve in the desired position along the length of the fastener.

In yet some further examples, the wind turbine hub assembly 1000 may comprise a fastener 401 in which an external surface defines one or more recesses 403 (illustrated in FIG. 6) to at least partially receive the corresponding gaskets 420. The recesses 403 ensure an accurate location of the gaskets 420 during the assembly process of the fastener 401 into the blade root insert 220. The gaskets 420 may be O-rings, planar gaskets or any other suitable sealing means such as any extruded profile sealing.

Note that the number and distribution of sleeves 410 and gaskets 420 may depend on particular requirements of the wind turbine or its blades, or on external factors to the wind turbine such as atmospheric conditions or others. For example, it may be possible to include more than one sleeve 410 around the fastener 401 with different absorption properties, or dimensions. It is further noted that the sleeves 410 may be closed loop sleeves with a certain degree of elasticity or may be in the form of strips of material that are fixed to the periphery of the fastener, i.e. by adhesives.

Figure 4:
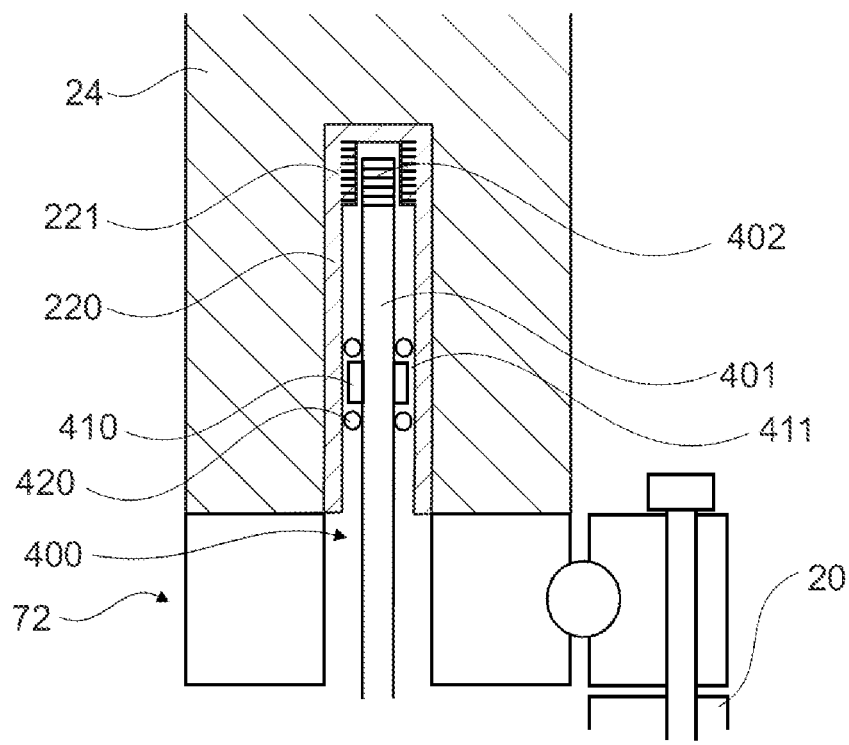
FIG. 4 schematically illustrates a fastener assembly in an unsaturated state according to one example through the plane A-A'.
Figure 5:
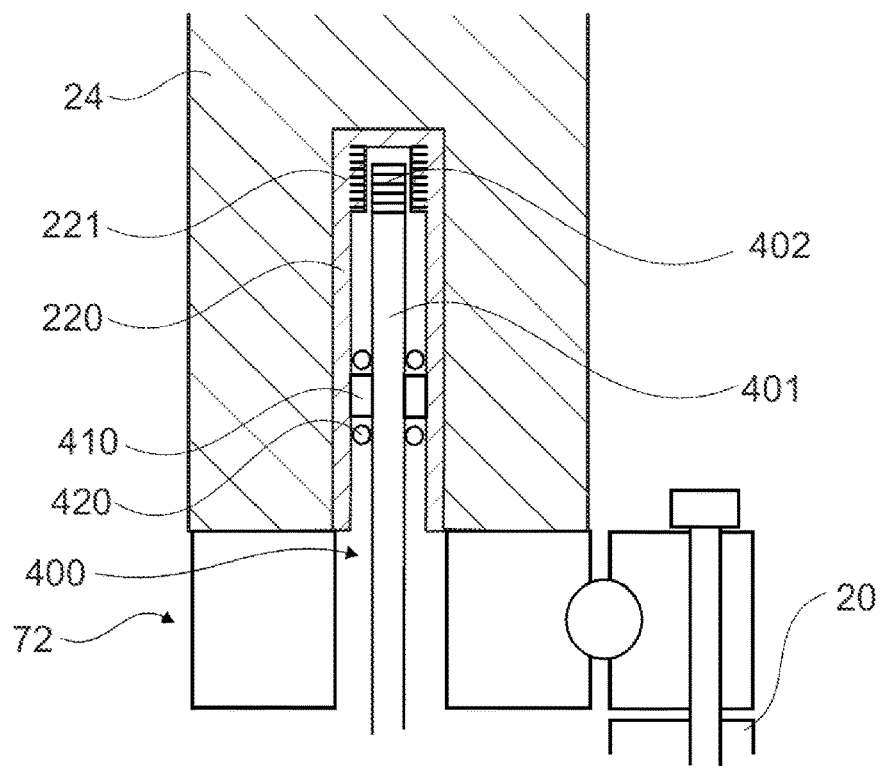
FIG. 5 schematically illustrates the fastener assembly of FIG. 4 in a saturated or partially saturated state.

FIGS. 4 and 5 illustrate different states of a fastener assembly according to the present invention through the plane A-A' illustrated in FIG. 3.

FIG. 4 schematically illustrates one example of a fastener assembly 400, wherein the sleeve is in an unsaturated state; i.e. the sleeve can still absorb more volume of liquid. In the state illustrated in FIG. 4, there is a gap 411 between the sleeve 410 and the inner wall of the blade root insert 220. Alternatively, the sleeve could be arranged along the inner wall of the blade root insert 220 and the gap may be between the sleeve 410 and the perimeter of the fastener 401. It is also possible that the sleeve, in an unsaturated state, occupies the entire distance between the inner wall of the blade root insert 220 and the perimeter of the fastener 401. When absorbing liquid, the sleeve 410 may not only increase its size in a radial direction, but also in a longitudinal direction. I.e. the sleeve 410 may cover an increased portion of the length of the fastener 401. The longitudinal expansion may further decrease the ingress of liquid.

The fastener assembly 400 for a wind turbine blade 22 to rotor hub 20 connection shown in FIG. 4 comprises a fastener 401 with one or more sleeves 410. The fastener 401 is configured to be fastened to a blade root insert 220. Further, the fastener 401 includes a threaded portion 402 for threadedly coupling to the blade root insert 220. Besides, the fastener 401 is configured to connect the pitch bearing 72 to the blade root 24. The pitch bearing in the present example comprises a first ring connected to the rotor hub 20 and a second ring connected to the wind turbine blade 22. Either the inner or the outer ring may be mounted to the wind turbine blade 22, the other being mounted to the rotor hub 20. In the illustrated examples, a single row of rolling elements is included, but the pitch bearing 72 may include multiple rows of rolling elements in other examples.

It is noted that in the illustrated examples, a pitch bearing 72 is arranged between the wind turbine blade 22 and the rotor hub 20. It is however possible to use the same or similar fastener assemblies 400 in the case wherein the wind turbine blade 22 is directly connected to the rotor hub 20 as well.

Additionally, the sleeves 410 are configured to absorb the ingress of liquid into the blade root insert 220, and are arranged at a non-threaded portion of the fastener 401. Said portion of the fastener 401 is configured to be inserted into the blade root insert 220.

In examples, the fastener assembly 400 includes a sleeve 410 that covers less than 20% of the length of the fastener 401. Therefore, a relatively small amount of sleeve 410 may be sufficient to drastically mitigate the ingress of liquid into the blade root insert 220. This results in an approach with very reduced additional material cost compared with existing assemblies that does not include sealing components. More particularly, the sleeves 410 may cover other lengths of the fastener 401, for example, the sleeves 410 may cover less than 15% of the length of the fastener 401, less than 10% of the length of the fastener 401 or less than 5% of the length of the fastener 401. Further, in some examples, the sleeves 410 may be arranged in a portion of the fastener that substantially coincides with an opening of the blade root insert 220. In particular, an end of the sleeve 410 that is closest to the rotor hub 20 (or pitch bearing 72) may be in or near the plane of the root 24 of the wind turbine blade 22.

The sleeves 410 may be made of an organic material, of a polymer or a combination of the same. For example, the sleeves 410 may be hydrophilic fabric for water absorption, and may comprise a superabsorbent polymer. More precisely, the organic sleeves 410 may contain wool, bamboo or hemp among others, whereas the polymer sleeves 410 may comprise any polymer with high moisture absorption capacity such as e.g. acrylic acid, and more specifically sodium polyacrylate.

In the present disclosure, a hydrophilic material may be understood as a material with high affinity for water-based products, i.e. absorbs water. Similarly, a superabsorbent polymer may be understood as a water-absorbing polymer which can absorb and retain large amounts of a water relative to its own mass or volume. In the present disclosure, a superabsorbent polymer may be regarded as a polymer able to absorb at least 50 times its weight of deionized and distilled water, and preferably at least 100 times. The ability to absorb water of a superabsorbent polymer may depend on the ionic concentration of the aqueous solution. Therefore, a superabsorbent polymer may absorb up to 300 times its weight of deionized and distilled water, and may have less ability to absorb water as salinity increases. Further, the capacity to absorb water and swell may be controlled by the type and degree of cross-linkers used to make the polymer. Whereas low density cross-linked polymers may have a higher absorbent capacity and may swell to a larger degree, high density cross-linked polymers may have lower absorbent capacity and swell.

Superabsorbent polymers may be made from the polymerization of acrylic acid blended with sodium hydroxide in the presence of an initiator to form a poly-acrylic acid sodium salt. Other materials may be also used to make a superabsorbent polymer, such as polyacrylamide copolymer, ethylene maleic anhydride copolymer, cross-linked carboxymethylcellulose, polyvinyl alcohol copolymers and cross-linked polyethylene oxide among others.

In examples, at least one of the sleeves 410 may be configured to absorb the ingress of oil into the blade root insert 220. The oil may originate from e.g. the gearbox, pitch gear systems, the hydraulic pumps or from coolant circuits among others. The sleeve 410 configured for the absorption of oil may be a hydrophobic material or may be a permeable material with a hydrophobic coating, as for example a melamine foam with epoxy resin coating. A hydrophobic material should be understood as a substance that does not have affinity for water, and tends to repel or not to absorb water. Therefore, a hydrophobic coating generates a thin surface layer that repels water. Different techniques, such as chemical etching, solution immersion, laser electrodeposition, template deposition or spray coating, can be used to generate this hydrophobic coating FIG. 5 schematically illustrates one example of a fastener assembly 400, wherein the sleeve 410 is in a saturated or partially saturated state. In this example, the sleeve 410 has swelled up and contacts both the fastener 401 and the inner wall of the blade root insert 220. Thus, the sleeve 410, also creates a mechanical barrier that prevents any liquid to flow towards the threaded portion of the fastener 401. Depending on the sleeve configuration, the sleeve 410 may also swell and expand along a longitudinal direction, thereby increasing the contact area with the fastener 401.

Although not illustrated in the example of FIG. 5, at least one of the sleeves 410 may comprise two or more layers which are arranged on top of each other along a longitudinal direction of the fastener. These layers may extend in a transverse direction i.e. perpendicular to the longitudinal direction. In examples, these layers may be separated by non-absorbent material to limit longitudinal permeability of liquid. In some examples, a first layer may be a hydrophobic material, and a second layer may be a hydrophilic material. Each of said layers may or may not be separated by non-absorbent material.

Figure 6:
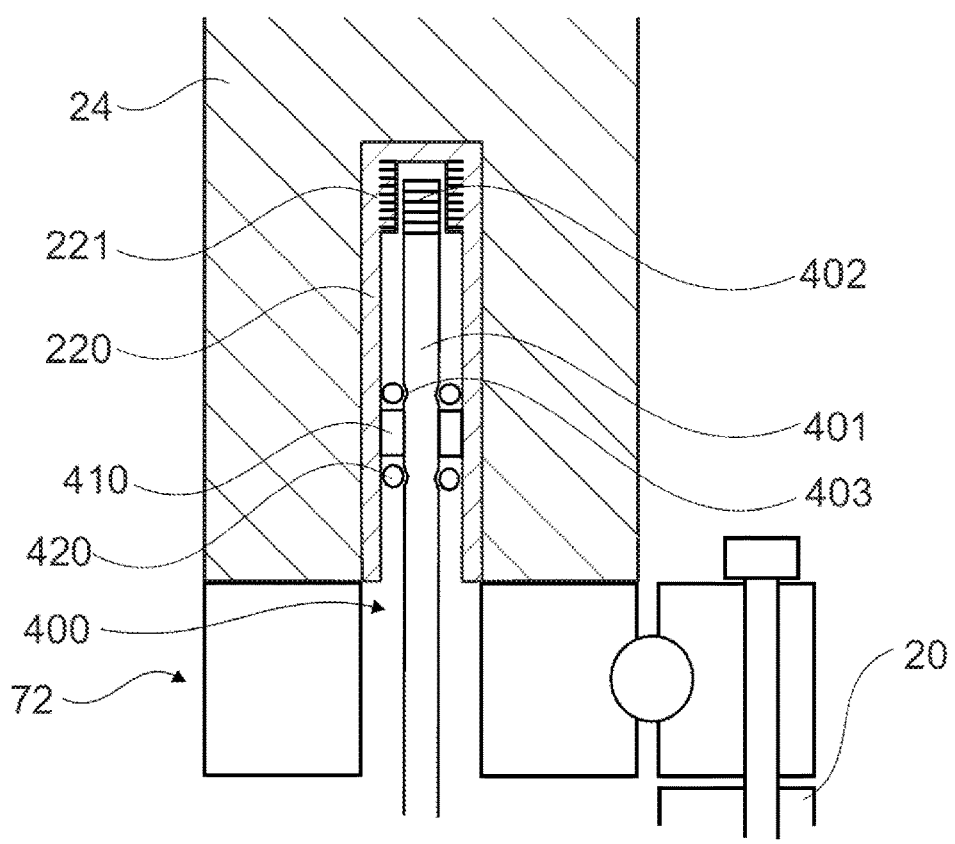
FIG. 6 schematically illustrates a fastener assembly according to another example through the plane A-A'.

FIG. 6 schematically illustrates a fastener assembly 400 according to another example, specifically shown in a cross-section through the plane A-A' in FIG. 3. In this example, the fastener assembly 400 comprises one or more gaskets 420 arranged at a non-threaded portion of the fastener 401. Said non-threaded portion of the fastener 401 is configured to be inserted into a blade root insert 220. The fastener assembly 400 of this example comprises two gaskets 420 arranged adjacent to the sleeves 410 along a fastener longitudinal direction, with one gasket 420 at each side of the sleeves 410. However, other number and arrangements of gaskets 420 and sleeves 410 may be employed depending on wind turbine specifications or atmospheric conditions of the site.

Besides, FIG. 6 illustrates that a fastener external surface may define one or more recesses 403 to at least partially receive the corresponding gaskets 420. A similar recess could also be defined to partially receive the sleeves 410. The recesses 403 partially limit the displacement of the gaskets 420 when the fastener 401 is introduced in the blade root portion 420.

Note that some of the technical features described in relation with the wind turbine hub assembly 1000 can be included in the fastener assembly 400, and vice versa.

Figure 7:
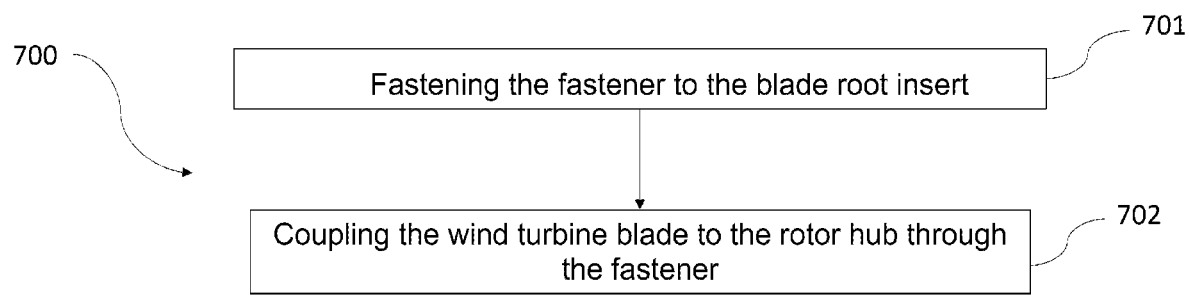
FIG. 7 is a flow diagram of a method to provide a fastener assembly according to one example.

FIG. 7 is a flow diagram of an example of a method 700 for coupling a wind turbine blade 22 to a rotor hub 20 with a fastener assembly 400. The fastener assembly 400 used in the method 700 includes a fastener 401, and one or more sleeves 410. The sleeves 410 are configured to absorb the ingress of liquid into a blade root insert 220 and are arranged at a non-threaded portion of the fastener 401. In particular, FIG. 7 shows that the method 700 comprises, at block 701, fastening the fastener 401 to the blade root insert 220 so that the sleeves 410 are inserted into the blade root insert 220. Further, the method 700 also comprises, at block 702, coupling the wind turbine blade 22 to the rotor hub 20 through the fastener 401.

According to this aspect, the method 700 allows to join a wind turbine blade 22 to a rotor hub 20 in a simple manner, whereas at the same time, it seals and isolates an inner part of the blade root insert 220 from the potential ingress of liquid. This method can be applied in both new and existing wind turbines.

In some further examples, the method 700 may further comprise the removal of a previously installed fastener 401 from the blade root insert 220, prior to the fastening step. During maintenance and/or inspection activities, fasteners 401 without such a sleeve 410 may be removed and be replaced with a fastener 401 with a sleeve 410 according to any of the examples described herein.

This written description uses examples to disclose the present teaching, including the preferred embodiments, and also to enable any person skilled in the art to practice it, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A fastener assembly for a wind turbine blade to rotor hub connection, the fastener assembly comprising:
   a fastener configured to be fastened to a blade root insert, the fastener including a threaded portion for threadedly coupling to the blade root insert; and
   one or more sleeves; wherein
   the sleeves are configured to absorb ingress of liquid into the blade root insert, and are arranged at a non-threaded portion of the fastener configured to be inserted into the blade root insert.

2. The fastener assembly according to claim 1, wherein the sleeves are configured to contact an inner wall of the blade root insert in a saturated or in a partially saturated state.

3. The fastener assembly according to claim 1, wherein the sleeves cover less than 20% of a length of the fastener.

4. The fastener assembly according to claim 1, wherein the sleeves are arranged in a portion of the fastener that substantially coincides with an opening of the blade root insert.

5. The fastener assembly according to claim 1, wherein at least one of the sleeves comprises a hydrophilic fabric for water absorption.

6. The fastener assembly according to claim 5, wherein the hydrophilic fabric comprises a superabsorbent polymer.

7. The fastener assembly according to claim 1, wherein at least one of the sleeves is configured to absorb the ingress of oil into the blade root insert.

8. The fastener assembly according to claim 1, wherein at least one of the sleeves comprises two or more layers arranged in a transverse direction relative to a fastener longitudinal direction.

9. The fastener assembly according to claim 8, wherein a first layer is a hydrophobic material, and a second layer is a hydrophilic material.

10. The fastener assembly according to claim 1, further comprising one or more gaskets arranged at a non-threaded portion of the fastener configured to be inserted into a blade root insert.

11. The fastener assembly according to claim 10, wherein two gaskets are arranged adjacent to the sleeves along a fastener longitudinal direction, one gasket at each side of the sleeves.

12. The fastener assembly according to claim 10, wherein an external surface of the fastener defines one or more recesses to at least partially receive the corresponding gaskets.

13. The fastener assembly according to claim 1, wherein the fastener is configured to connect two rings of a pitch bearing wherein a first ring is connected to the rotor hub and a second ring is connected to the wind turbine blade.

14. A method for coupling a wind turbine blade to a rotor hub with a fastener assembly, the fastener assembly including a fastener, and one or more sleeves configured to absorb the ingress of liquid into a blade root insert and arranged at a non-threaded portion of the fastener, the method comprising:
fastening (701) the fastener to the blade root insert so that the sleeves are inserted into the blade root insert, and
coupling the wind turbine blade to the rotor hub through the fastener.

15. The method for coupling a wind turbine blade to a rotor hub according to claim 14, wherein prior to the fastening (701) step, a previously installed fastener is removed from the blade root insert.

\* \* \* \* \*